(12) United States Patent
Cushing et al.

(10) Patent No.: US 7,971,218 B2
(45) Date of Patent: Jun. 28, 2011

(54) DISTRIBUTION OF REAL-TIME ENTERTAINMENT SCHEDULING DATA

(75) Inventors: Michael P. Cushing, Saratoga Springs, NY (US); Gary L. Evans, Fort Edward, NY (US); Bryan A. Shannon, Hudson Falls, NY (US); Kelly A. Strong, Hudson Falls, NY (US); Brian J. Ward, Saratoga Springs, NY (US); Melissa E. White, Fort Edward, NY (US)

(73) Assignee: Tribune Media Services, Inc., Chicago, IL (US)

( * ) Notice: Subject to any disclaimer, the term of this patent is extended or adjusted under 35 U.S.C. 154(b) by 1665 days.

(21) Appl. No.: 10/265,564

(22) Filed: Oct. 4, 2002

(65) Prior Publication Data

US 2004/0068742 A1    Apr. 8, 2004

(51) Int. Cl.
*H04N 5/445* (2006.01)

(52) U.S. Cl. ........................... 725/50; 725/48
(58) Field of Classification Search .................... 725/39, 725/44, 49, 50, 55
See application file for complete search history.

(56) References Cited

U.S. PATENT DOCUMENTS

| | | | |
|---|---|---|---|
| 5,657,072 A | | 8/1997 | Aristides et al. |
| 5,666,645 A | * | 9/1997 | Thomas et al. ................. 725/47 |
| 5,893,091 A | | 4/1999 | Hunt et al. |
| 6,216,265 B1 | * | 4/2001 | Roop et al. ....................... 725/54 |
| 6,239,794 B1 | | 5/2001 | Yuen et al. |
| 6,268,849 B1 | * | 7/2001 | Boyer et al. ..................... 725/40 |
| 6,317,881 B1 | | 11/2001 | Shah-Nazaroff et al. |
| 6,536,041 B1 | * | 3/2003 | Knudson et al. ................ 725/39 |
| 6,807,558 B1 | * | 10/2004 | Hassett et al. ................ 709/203 |
| 6,904,609 B1 | * | 6/2005 | Pietraszak et al. .............. 725/39 |
| 2001/0020298 A1 | * | 9/2001 | Rector et al. ..................... 725/50 |
| 2002/0010587 A1 | * | 1/2002 | Pertrushin ..................... 704/275 |
| 2002/0093592 A1 | * | 7/2002 | Naka et al. ..................... 348/537 |
| 2003/0004937 A1 | * | 1/2003 | Salmenkaita et al. ............ 707/3 |
| 2003/0222975 A1 | * | 12/2003 | Klosterman ..................... 348/40 |
| 2004/0024846 A1 | * | 2/2004 | Randall et al. ................ 709/219 |

FOREIGN PATENT DOCUMENTS

WO        98/26584        6/1998

* cited by examiner

*Primary Examiner* — Andrew Y Koenig
*Assistant Examiner* — Aklil Tesfaye
(74) *Attorney, Agent, or Firm* — Gray Robinson, P.A.

(57) ABSTRACT

A method, system, and software for distributing entertainment scheduling data (e.g., television scheduling data, movie scheduling data, etc.) to end users. Entertainment scheduling data updates are entered into an editorial database and then used to rapidly update a real-time database. A subset of entertainment scheduling data from the real-time database may be transmitted from the real-time database to an end-user database of an end user. The subset may be transmitted across a communication interface (e.g., the Internet) from the real-time database to the end-user database. An intermediate destination (e.g., a File Transfer Protocol server) between the real-time database and the communication interface may be used for temporary parking of the subset.

10 Claims, 13 Drawing Sheets

SCHEDULE RECORD

| Field # | Field Name | Min | Max | Field Description | Field Example |
|---|---|---|---|---|---|
| 1 | tf_station_num | 1 | 10 | Unique station ID number. | 11259 |
| 2 | tf_database_key[3] | 12 | 12 | Unique description identifier necessary to reference movies, shows, episodes, sports from description file. | MV1234560000; SH0123450000 |
| 3 | tf_air_date | 8 | 8 | Date the program airs based on a 12:00 AM start of day; yyyymmdd format. | 19950721 |
| 4 | tf_air_time | 4 | 4 | Time of day the program airs; hhmm military format. | 0000 is midnight |
| 5 | tf_duration | | 4 | Calculated by subtracting the current program's air time from the subsequent program's air time; hhmm format. | 0059 is fifty-nine minutes; 0125 is one hour and twenty five minutes |
| 6 | tf_part_num | | 3 | Designates which part, when a program is split into 2 or more viewings. | 1 |
| 7 | tf_num_of_parts | | 3 | Designates when a program is split into 2 or more parts for viewing. | 3 |
| 8 | tf_cc | | 1 | Closed Captioning: Spoken content of program is listed on screen for the hearing-impaired. | Y or N |
| 9 | tf_stereo | | 1 | Value designates whether a show, episode, movie or sports event is being broadcast in stereo. | Y or N |
| 10 | tf_repeat | | 1 | Designates a program which has aired previously. | Y or N |

SCHEDULE RECORD

| Field # | Field Name | Min | Max | Field Description | Field Example |
|---|---|---|---|---|---|
| 11 | tf_live_tape_delay | | 5 | Designates whether a sports event is being played live, same-day delay, or taped prior to the air date. | Live |
| 12 | tf_subtitled | | 1 | Used for foreign movies and shows, if the audio is in a foreign language, the English translation appears on-screen. | Y or N |
| 13 | tf_premiere_finale | | 15 | Designates a program's premiere or finale, if applicable. | Season Premiere |
| 14 | tf_joined_in_progress | | 1 | Joined in progress identifies when a station begins airing a program after the official start time. | Y or N |
| 15 | tf_cable_in_the_clas sroom | | 1 | Designates a show is available through the Cable in the Classroom program. | Y or N |
| 16 | tf_tv_rating | | 4 | TV Parental Guidelines in text form. | TV13 |
| 17 | tf_sap | | 1 | Designates whether the program is subject to Secondary Audio Program coding. | Y or N |
| 18 | tf_blackout | | 1 | Designates whether the program is subject to blackout restrictions. | Y or N |
| 19 | tf_sex_rating | | 1 | Indicates adult situations. | Y or N |
| 20 | tf_violence_rating | | 1 | Iindicates violent situations. | Y or N |
| 21 | tf_language_rating | | 1 | Indicates strong language. | Y or N |
| 22 | tf_dialog_rating | | 1 | Indicates strong dialogue. | Y or N |

SCHEDULE RECORD

| Field # | Field Name | Min | Max | Field Description | Field Example |
|---|---|---|---|---|---|
| 23 | tf_fv_rating | | 1 | Indicates fantasy violence. | Y or N |
| 24 | tf_enhanced | | 1 | Designates enhanced program information. | Y or N |
| 25 | tf_three_d | | 1 | Designates show is in 3-D. | Y or N |
| 26 | tf_letterbox | | 1 | Designates program is a letterbox version. | Y or N |
| 27 | tf_hdtv | | 5 | Designates whether a show is broadcast in High Definition TV. | Y or N |
| 28 | tf_dolby | | 1 | Designates a program in Dolby or Dolby Digital. | Dolby, DD |
| 29 | tf_dvs | | | Designates a program with Descriptive Video Service. | Y or N |
| 30 - 40 | tf_user_data | | | reserved | |

STATION RECORD

| Field # | Field Name | Min | Max | Field Description | Field Example |
|---|---|---|---|---|---|
| 1 | tf_station_num | 1 | 10 | Unique station ID number. | 11259 |
| 2 | tf_station_time_zone | | 30 | Native time zone of a station. | Eastern D.S. |
| 3 | tf_station_name | | 40 | Long name of a station. | WABC-TV, Home Box Office |
| 4 | tf_station_call_sign | 1 | 10 | Mnemonic or FCC-recognized call sign for long name of a station. | WABC, HBO |
| 5 | tf_station_affil | | 25 | Network, cable or broadcasting group with which a station is associated. | ABC Affiliate, PAY |
| 6 | tf_station_city | | 20 | Station mailing address: city. | New York |
| 7 | tf_station_state | | 15 | Station mailing address: state. | NY |
| 8 | tf_station_zip_code | | 12 | Station mailing address: ZIP Code. | 10023 |
| 9 | tf_station_country | | 15 | Station mailing address: country. | USA |
| 10 | tf_dma_name | | 70 | City and state of the broadcast station designated market area. | New York, NY |
| 11 | tf_dma_num | | 10 | Numeric ranking of the designated market area. | 1 |
| 12 | tf_fcc_channel_num | | 8 | FCC channel number of a broadcast station. | 7 |
| 13-22 | tf_user_data | | | Reserved | |

FIG. 6A

PROGRAM RECORD

| Field # | Field Name | Min | Max | Field Description | Field Example |
|---|---|---|---|---|---|
| 1 | tf_database_key[3] | 12 | 12 | Unique description identifier, necessary to reference movies, shows, episodes, sports from description file. | MV1234560000; SH0123450000 |
| 2 | tf_title | 1 | 120 | Official name by which a movie, show, episode or sports event is known. | In the Heat of the Night |
| 3 | tf_reduced_title | | 70 | Shortened version of a program's original title. | In the Heat of Night |
| 4 | tf_reduced_title | | 40 | Shortened version of a program's original title. | Heat of the Night |
| 5 | tf_reduced_title | | 20 | Shortened version of a program's original title. | Heat of Night |
| 6 | tf_reduced_title | | 10 | Shortened version of a program's original title. | Heat |
| 7 | tf_alt_title | | 120 | Alias name for program title; the title "Paid Programming" is stored here. | Feed the Children |
| 8 | tf_reduced_desc | | 100 | Shorter version of a program's original description. | Pete and Berg tell Bill the story of how they met Sharon in college. |
| 9 | tf_reduced_desc | | 60 | Shorter version of a program's original description. | Pete and Berg tell Bill how they met Sharon in college. |
| 10 | tf_reduced_desc | | 40 | Shorter version of a program's original description. | Pete and Berg recall how they met Sharon. |
| 11 | tf_advisory_desc | | 30 | Notation of adult content in movies, shows and episodes. | Adult Situations |
| 12 | tf_advisory_desc | | 30 | Notation of explicit language in movies, shows and episodes. | Graphic Language |

PROGRAM RECORD

| Field # | Field Name | Min | Max | Field Description | Field Example |
|---|---|---|---|---|---|
| 13 | tf_advisory_desc | | 30 | Notation of nudity in movies, shows and episodes. | Brief Nudity |
| 14 | tf_advisory_desc | | 30 | Notation of violence in movies, shows and episodes. | Graphic Violence |
| 15 | tf_advisory_desc | | 30 | Notation of sexual content in movies, shows and episodes. | Strong Sexual Content |
| 16 | tf_advisory_desc | | 30 | Notation of rape in movies, shows and episodes. | Rape |
| 17,20...7 4 | tf_cast_first_name | | 20 | First name of an actor listed in the cast of a show, episode or movie. | Tom |
| 18,21...7 5 | tf_cast_last_name | | 20 | Last name of an actor listed in the cast of a show, episode or movie. | Hanks |
| 19,22...7 6 | tf_cast_role_desc | | 30 | Designates actor or guest star. | Actor |
| 77,80...1 34 | tf_credits_first_name | | 20 | First name of a host, director, producer, executive producer or writer of a show, episode or movie. | Cameron |
| 78,81...1 35 | tf_credits_last_name | | 20 | Last name of a host, director, producer, executive producer or writer of a show, episode or movie. | Crowe |
| 79,82...1 36 | tf_credits_role_desc | | 30 | Describes programming credits of a show or movie. | Director |
| 137-142 | tf_genre_desc (See Appendix A) | | 30 | Word or group of words that classifies a show, episode, movie or sports event. | Cooking |
| 143 | tf_desc | | 255 | Word string that describes the show, episode or movie content. | Roseanne buys a shiny new 1998 Chevy Camaro. |
| 144 | tf_year | | 4 | The year in which a feature film was released; yyyy format; for movies only. | 1998 |

PROGRAM RECORD

| Field # | Field Name | Min | Max | Field Description | Field Example |
|---|---|---|---|---|---|
| 145 | tf_mpaa_rating | | 5 | Rating supplied by the Motion Picture Association of America; for movies only. | PG-13 |
| 146 | tf_star_rating | | 5 | In movies, an arbitrary critical rating from 1/2 to 4 stars. | ***+ |
| 147 | tf_run_time | | 4 | Actual length of time any programming airs. Not the same as duration; hhmm format; for movies only. | 0059 is fifty-nine minutes; 0125 is one hour and twenty five minutes |
| 148 | tf_color_code | | 20 | Designates whether a program was produced in color or black/white. | Colorized |
| 149 | tf_program_language | | 10 | Language of the copy (description) of a program. | Spanish |
| 150 | tf_org_country | | 15 | Used in movies to distinguish between domestic and foreign films. Also known as country of origin. | USA |
| 151 | tf_made_for_tv | | 1 | Designator for a film that was made specifically for television. | Y or N |
| 152 | tf_source_type | | 10 | Specifies network, local, syndicated or multiple-block programming. | Syndicated |
| 153 | tf_show_type | | 30 | Distinguishes how a program was originally produced and/or distributed. | Paid Programming; Series |
| 154 | tf_holiday | | 30 | Description of a recognized or traditional holiday. | Christmas |
| 155 | tf_syn_epi_num | | 20 | Distributor-designated number corresponding to an episode of a specific show. | 16 |

FIG. 6D

PROGRAM RECORD

| Field # | Field Name | Min | Max | Field Description | Field Example |
|---|---|---|---|---|---|
| 156 | tf_alt_syn_epi_num | | 20 | Alternate numbering system for syndicated programming. Can differ from syndicated numbering system. | 809 |
| 157 | tf_epi_title | | 150 | Also known as the subtitle; descriptive title within an episode; team vs. team can be located here. | The Puffy Shirt; Super Bowl XXXIII: Atlanta Falcons vs. Denver Broncos |
| 158 | tf_net_syn_source | | 10 | Originating network. Not populated during beta testing. | Fox |
| 159 | tf_net_syn_type | | 21 | Specifies broadcast network, first run syndicated, cash barter or off-network programming. Not populated during beta testing. | First run syndicated |
| 160 | tf_desc | | 255 | Word string that describes the show, episode or movie content and includes embedded actors within the description. | A tornado whisks Kansas farm girl Dorothy (Judy Garland) and her dog, Toto, to a magical land populated by odd characters (Ray Bolger)(Bert Lahr). |
| 161 | tf_reduced_desc | | 100 | Shorter version of a program's original description which includes embedded actors within the description. | A tornado whisks Kansas farm girl Dorothy (Judy Garland) into a magical land. |
| 162 | tf_org_studio | | 25 | Name of company responsible for the distribution of a movie. | 20th Century Fox |

PROGRAM RECORD

| Field # | Field Name | Min | Max | Field Description | Field Example |
|---|---|---|---|---|---|
| 163 | tf_game_date | | 8 | Game date as reported by league or station schedule; yyyymmdd format. | 19991025 |
| 164 | tf_game_time | | 4 | Game time as reported by league or station schedule; hhmm format. | 1700 |
| 165 | tf_game_time_zone | | 30 | Time zone of tf_game_time, not necessarily the time zone of the event. | Eastern D.S. |
| 166 | tf_org_air_date | | 8 | Original air date for the program. | 19960914 |
| 167 | tf_unique_id | | 8 | Unique hexadecimal ID for the program. | 15b9275a |
| 168-180 | tf_user_data | | | reserved | |

*FIG. 6E*

TRANSLATION RECORD

| Field # | Field Name | Min | Max | Field Description | Field Example |
|---|---|---|---|---|---|
| 1 | tf_english_trans | 1 | 30 | Word or group of words to be translated. | Cooking |
| 2 | tf_program_language | 1 | 10 | Language of the copy (description) of a program. | French |
| 3 | tf_language_trans | 1 | 30 | tf_program_language translation of tf_english_trans. | Cuisine |

DISTRIBUTION OF REAL-TIME ENTERTAINMENT SCHEDULING DATA

BACKGROUND OF THE INVENTION

1. Technical Field

The present invention relates to a method, system, and software for distributing data, including a method, system, and software for distributing entertainment scheduling data.

2. Related Art

Current methods for distributing television scheduling data to end users lack optimal timeliness. Thus, there is a need for a method, system, and software for distributing television scheduling data to end users with improved timeliness.

SUMMARY OF THE INVENTION

In first embodiments, the present invention provides a method for distributing data, comprising updating a real-time database with entertainment scheduling content extracted from an editorial database:
  wherein the real-time database is recorded in a first computer-readable medium;
  wherein the editorial database is recorded in a second computer-readable medium;
  wherein the real-time database includes entertainment scheduling data that comprises said content upon completion of said updating;
  wherein said content had not existed in the real-time database prior to said updating;
  wherein prior to said updating, an editing of the editorial database had occurred resulting in placement of said content in the editorial database;
  wherein said content had not existed in the editorial database prior to said editing;
  wherein said editing ended at time $T_1$;
  wherein said updating ended at time $T_2$ such that $T_2 > T_1$;
  wherein the entertainment scheduling data in the real-time database is adapted to have portions thereof become available to a plurality of end users; and
  wherein extraction of the content from the editorial database is not based on a target environment context of any of said end users.

In second embodiments, the present invention provides a method for distributing data, comprising receiving by an end-user database of an end user a dataset that is stored in a real-time database:
  wherein the real-time database is recorded in a first computer-readable medium;
  wherein the end-user database is recorded in a second computer-readable medium;
  wherein the real-time database includes entertainment scheduling data that comprises the dataset;
  wherein the dataset includes entertainment scheduling content; and
  wherein said receiving updates the end-user database with the dataset without logical modification of the dataset.

In third embodiments, the present invention provides a system for distributing data, comprising a real-time database:
  wherein the real-time database is recorded in a first computer-readable medium;
  wherein the real-time database includes entertainment scheduling data that comprises a dataset,
  wherein the dataset includes entertainment scheduling content for updating an end-user database of an end user;
  wherein the end-user database is recorded in a second computer-readable medium; and
  wherein receipt of said dataset by said end-user database updates the end-user database with the dataset without logical modification of the dataset.

In fourth embodiments, the present invention provides a system for distributing data, said system comprising an end user having an end-user database that is adapted to receive a dataset which is stored in a real-time database:
  wherein the real-time database is recorded in a first computer-readable medium;
  wherein the end-user database is recorded in a second computer-readable medium;
  wherein the real-time database includes entertainment scheduling data that comprises the dataset;
  wherein the dataset includes entertainment scheduling content; and
  wherein receipt of the dataset updates the end-user database with the dataset without logical modification of the dataset.

In fifth embodiments, the present invention provides a computer program product, comprising a computer usable medium having a computer readable program code embodied therein, wherein the computer readable program code comprises an algorithm adapted to effectuate an updating of a real-time database that comprises entertainment scheduling data:
  wherein the real-time database is recorded in a first computer-readable medium;
  wherein said updating of the real-time database updates the entertainment scheduling data with entertainment scheduling content that is extracted from an editorial database through an editing of the editorial database;
  wherein the editorial database is recorded in a second computer-readable medium;
  wherein the algorithm is adapted to effectuate a completion of the updating of the real-time database in a time interval $\Delta T$ following completion of the editing of the editorial;
  wherein the entertainment scheduling data in the real-time database is adapted to have portions thereof become available to a plurality of end users; and
  wherein extraction of the entertainment scheduling content from the editorial database is not based on a target environment context of the end user.

In sixth embodiments, the present invention provides a computer program product, comprising a computer usable medium having a computer readable program code embodied therein, wherein the computer readable program code comprises an algorithm adapted to effectuate pushing a dataset from a real-time database to a computer-readable medium of a destination:
  wherein the real-time database is recorded in a first computer-readable medium;
  wherein the real-time database includes entertainment scheduling data that comprises the dataset,
  wherein the dataset comprises entertainment scheduling content;
  wherein the dataset at the destination is adapted to be transmitted to an end-user database of an end user via a communication link between the destination and the end-user database;
  wherein the end-user database is recorded in a second computer-readable medium; and
  wherein receipt of the dataset by the end-user database updates the end-user database with the dataset without logical modification of the dataset.

In seventh embodiments, the present invention provides a computer program product, comprising a computer usable medium having a computer readable program code embodied therein, wherein the computer readable program code comprises an algorithm adapted to effectuate pushing a dataset from a real-time database to an end-user database of an end user:

wherein the real-time database is recorded in a first computer-readable medium;

wherein the end-user database is recorded in a second computer-readable medium;

wherein the real-time database includes entertainment scheduling data that comprises the dataset;

wherein the dataset comprises entertainment scheduling content;

wherein the dataset at the real-time database is adapted to be transmitted to the end-user database via a communication link between the real-time database and the end-user database; and wherein receipt of the dataset by the end-user database updates the end-user database with the dataset without logical modification of the dataset.

The method and system of the present invention beneficially provides a method, system, and software for distributing entertainment scheduling data (e.g., television scheduling data, movie-theatre scheduling data, etc.) to end users with improved timeliness.

BRIEF DESCRIPTION OF THE DRAWINGS

FIGS. 4A, 4B, and 4C show the fields of a television (TV) schedule record of a database table, in accordance with embodiments of the present invention.

FIG. 5 shows the fields of a TV station record of a database table, in accordance with embodiments of the present invention.

FIGS. 6A, 6B, 6C, 6D, and 6E show the fields of a TV program of a database table, in accordance with embodiments of the present invention.

FIG. 7 shows the fields of a TV translation record of a database table, in accordance with embodiments of the present invention.

DETAILED DESCRIPTION OF THE INVENTION

Figure 1:
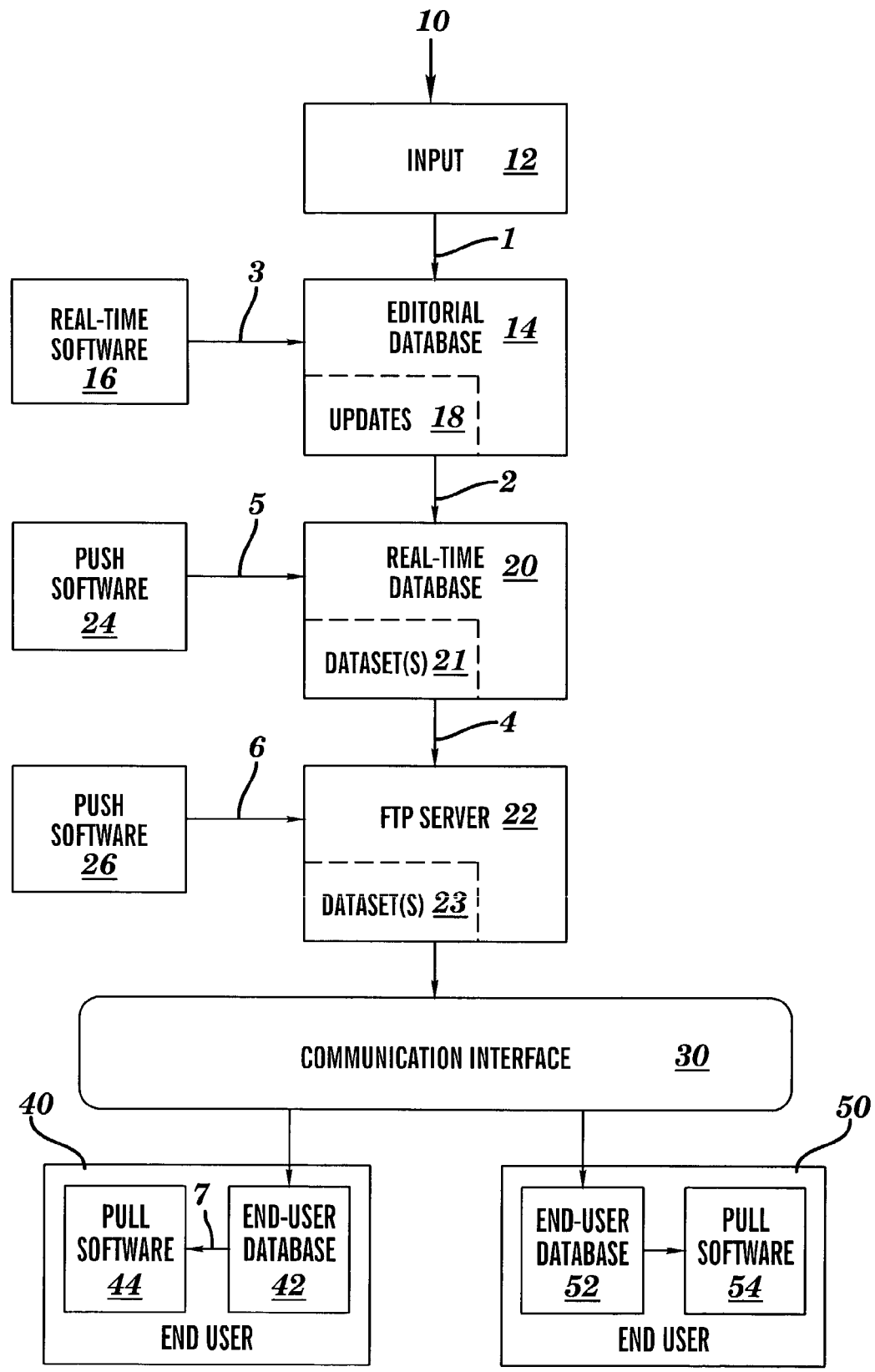
FIG. 1 depicts a system for distributing entertainment scheduling data to end users from a real-time database and through use of a File Transfer Protocol (FTP) server, in accordance with embodiments of the present invention.

FIG. 1 depicts a system 10 for distributing entertainment scheduling data, in accordance with embodiments of the present invention. The system 10 comprises an editorial database 14, a real-time database 20, a File Transfer Protocol (FTP) server 22, a communication interface 30, end user 40 and 50, real-time software 16, push software 24, and push software 26.

The editorial database 14 and the real-time database 20 (as well as end-user databases 42 and 52, discussed infra) are each embedded or recorded in a computer-usable or computer-readable medium. Similarly, the real-time software 16, push software 24, and push software 26 each comprise computer readable program code and are each embedded or recorded in a computer-usable or computer-readable medium. For the present invention, a computer-usable or computer-readable medium comprises, inter alia, a computer storage or memory device (e.g., hard disk, floppy disk, magnetic tape, optical storage such as a compact disc (CD) or a digital video disc (DVD), dynamic random access memory (DRAM), a read-only memory (ROM), etc.).

The editorial database 14 comprises, inter alia, entertainment scheduling data such as, inter alia, television (TV) scheduling data, movie-theatre scheduling data, sports events scheduling data, musical performance scheduling data, live theater scheduling data, etc. Movie-theatre scheduling data is defined herein as pertaining to movies at movie theaters. The scheduling data relates to any data directly or indirectly associated with the scheduling of the entertainment events and the events that are scheduled. For example, TV scheduling data may include the type of data typically associated with an electronic program guide (EPG) such as data relating to dates and times that TV programs are scheduled to be aired and associated TV channel lineups, program description identifiers (e.g., to identify movies, shows, episodes, sports events, etc.), availability of closed captioning (e.g., to assist hearing-impaired viewers), program ratings (e.g., indications of adult situations, sexual content, violent situations, strong language, strong dialogue, fantasy violence, etc.), program presentation technology (e.g., 3-D format, high definition TV, Dolby/Dolby digital, etc.), foreign language indication, actors/actresses, programming credits of a show or movie, name of company responsible for distribution of a movie, the year a feature film was released, indication that a film was made specifically for television, etc. The preceding examples of TV scheduling data is a small fraction of TV scheduling data generally. The scope of the present invention includes any TV scheduling data, and any entertainment scheduling data associated with any other entertainment category such as movie-theatre scheduling data, sports events scheduling data, musical performance scheduling data, live theatre scheduling data, etc. The scope of the present invention also includes scheduling data unrelated to entertainment such as, inter alia, scheduling for travel (by air, train, ship, etc.), scheduling of activities in the workplace, scheduling of events for a campaign relating to a election, etc.

The editorial database 14 is edited to receive input 12 periodically or at random times; generally, whenever such input 12 is made available to the editorial database 14 over a communication path 1. The communication path 1 may represent, inter alia, an entry path of the input 12 into the editorial database 14 after having been manually entered by a user. Thus, the editing may be manual, automated, or both. As an example of automated editing, the input 12 may be entered, as received from a source, through an updating algorithm wherein manual effort is not required. The input 12 and editing thereof updates the editorial database 14. Each such input 12 received by the editorial database 14 is a group of entertainment scheduling data, and successive groups are received periodically or at random times. The input 12 may include new entertainment scheduling data not currently in the editorial database 14, correction data intended to replace existing entertainment scheduling data in the editorial database 14, and replications of already existing entertainment scheduling data in the editorial database 14.

The real-time software 16 operates on the editorial database 14 to extract (i.e., copy but not remove) updates 18 from the editorial database 14 to the real-time database 20, so that the real-time software 16 effectively "pushes" the updates 18 to the real-time database 20. The direction of the arrowhead shown on the communication path 3 between the real-time software 16 and the editorial database 14 denotes that the real-time software 16 is "pushing" the updates 18 from the editorial database 14 to the real-time database 20 over a communication path 2. The updates 18 are data changes of the input data 12, namely new entertainment scheduling data not currently in the editorial database 14 and correction entertainment scheduling data intended to replace existing data in the editorial database 14. The updates 18 may be partitioned into groups, resulting in the updates 18 being transmitted to the real-time database 20 as groups of entertainment scheduling updates.

Portions of the updates 18 may be subsequently transmitted to the end users 40 and 50, or to any other end users. However, extraction of the entertainment scheduling content from the editorial database 14 is not based on a target environment context of any of said end users (or "targets") but instead is end-user independent. This aspect of the present invention is one of the features that distinguishes the present invention from U.S. Pat. No. 5,666,645 (Thomas et al., issued Sep. 9, 1997), wherein in Thomas "feed extraction process 710 connects to the main database 90 and extracts the appropriate content information based on the target environment context" (emphasis added) (see Thomas, col. 11, lines 47-49). For the present invention, the "target environment context" of an individual end user identifies the entertainment scheduling data that is intended to be transmitted to the individual end user.

The real-time database 20 may comprise, inter alia, tables in any database environment such as a relational database that could be accessed by Structured Query Language (SQL). The real-time database 20 includes entertainment scheduling data that comprises the entertainment scheduling content of the updates 18. As an illustration under the assumption that the entertainment scheduling data comprises TV scheduling data, the real-time database 20 may comprise relational database tables, each having a plurality of records in accordance with the record layouts (in terms of fields) shown infra in FIGS. 4A, 4B, 4C, FIG. 5, FIG. 6A, FIG. 6B, FIG. 6C, FIG. 6D, FIG. 6E, and FIG. 7, in accordance with embodiments of the present invention. Hereinafter, FIG. 4 shall denote FIGS. 4A, 4B, and 4C collectively, and FIG. 4 shows the fields of a schedule record of a database table. FIG. 5 shows the fields of a TV station record of a database table. Hereinafter, FIG. 6 shall denote FIGS. 6A, 6B, 6C, 6D, and 6E collectively, and FIG. 6 shows the fields of a program record of a database table. FIG. 7 shows the fields of a TV translation record of a database table. In FIG. 4, the schedule record identifies the TV content of a unique channel-time slot (i.e., unique combination of date, time, and TV channel). The primary key that makes each such schedule record unique is the combination of date, time, and station (i.e., channel), which are respectively represented in fields 3, 4, and 1. The station identifier of field 1 of the schedule record is a foreign key associated with the station record of FIG. 5. The TV program identifier of field 2 of the schedule record is a foreign key associated with the program record of FIG. 6. In FIG. 5, the station record identifies the characteristics (e.g., location) of a unique TV station. The primary key that makes each such station record unique is the unique station identifier in field 1, which also serves as a foreign key in the schedule record of FIG. 4 as stated supra. In FIG. 6, the program record identifies the characteristics (program name, actor, language, etc.) of a unique TV program. The primary key that makes each such program record unique is the unique program identifier in field 1, which also serves as a foreign key in the schedule record of FIG. 4 as stated supra. In FIG. 7, the translation record provides an English translation of a foreign word or phrase.

As stated supra, the updates 18 are extracted from the editorial database 14 and then transmitted to the real-time database 20 and are used to update the real-time database 20. Said updating of the real-time database 20 may occur within a time interval $\Delta T$ following completion of the editing of the editorial database 14 such that $\Delta T$ does not exceed about 240 minutes. The present invention is also capable of achieving better timings such that $\Delta T$ does not exceed a value below 240 minutes such as, inter alia, any of the following values below 240 minutes: about 180 minutes, 120 minutes 60 minutes, 30 minutes, 15 minutes, 10, minutes, 5 minutes, 3 minutes, and 2 minutes. Projecting into the future, the scope of the present invention also includes $\Delta T$ not exceeding about 1 minute. Thus any of the preceding values of $\Delta T$ may pertain to an update from the editorial database 14 to the real-time database 20.

The preceding values of $\Delta T$ are directed an to individual, discrete updating. However for a plurality of such updatings, a parameter $\Delta T_{AVE}$ may be defined as a statistical average of $\Delta T$ over said plurality of such updatings of the real-time database 20. $\Delta T_{AVE}$ may be computed by any recognized statistical averaging process and may represent an arithmetic average, a weighted average, etc. For N values of $\Delta T$ of $\Delta T_1$, $\Delta T_2, \ldots, \Delta T_N$, the arithmetic average of $\Delta T$ is computed as $(\Delta T_1 + \Delta T_2 + \ldots + \Delta T_N)/N$. For the same N values of $\Delta T$, the weighted average of $\Delta T$ is computed as $(W_1 \Delta T_1 + W_2 \Delta T_2 + \ldots + W_N \Delta T_N)/(W_1 + W_2 + \ldots + W_N)$, wherein the weights $W_1, W_2, \ldots, W_N$ may be based on any desired weighting criteria. The present invention is capable of achieving timings such that $\Delta T_{AVE}$ does not exceed about any of the following values: 10 minutes, 5 minutes, 2 minutes, and 1 minute. Thus any of the preceding values of $\Delta T_{AVE}$ may pertain to a plurality of updates from the editorial database 14 to the real-time database 20.

With the preceding low values of $\Delta T$ and $\Delta T_{AVE}$, the real-time database 20 may have the characteristic of being updated quasi-continuously in real time, which accounts for the term "real-time" in the phrase "real-time database." Nonetheless, the real-time database 20 may not be so limited by $\Delta T$ and $\Delta T_{AVE}$ in some embodiments of the present invention. When low values of $\Delta T$ and $\Delta T_{AVE}$ are applicable, the real-time software 16 uses various techniques to achieve the low values of $\Delta T$ and $\Delta T_{AVE}$ which may include, inter alia, multi-thread processing. The real-time software 16 uses any technique of multi-thread processing known to a person of ordinary skill in the art such as, inter alia, multi-thread processing techniques that take advantage of parallel processors, multiple registers, etc. to facilitate simultaneous updating of multiple portions of the real-time database 20. As a result, the updating of the real-time database 20 with the entertainment scheduling content comprises multi-threaded updating of the real-time database 20 with the entertainment scheduling content.

The end user 40 is a computer system that comprises the end-user database 42, and the end user 50 is a computer system that comprises the end-user database 52. Although FIG. 1 depicts only the end users 40 and 50, the system 10 generally includes M such end-user database such that M≧1; i.e., M is any positive integer. Another term for expressing "end user" is "target." The M end-users may be within a local area network (LAN), wide area network (WAN), or any other network such that the N end-users are coupled to the real-time database 20 through the communication interface 30 as shown. Hence, the communication interface 30 may comprise, inter alia, the Internet. Generally, the communication interface 30 comprises any communication interface known to one of ordinary skill in the art for coupling N end-users to the real-time database 20. The following discussion focuses on the end user 40 as also representing any other end user such as the end user 50 or one of the M end users. Likewise, the preceding discussion that related to the end user 40 also pertained to any other end user such as the end user 50 or one of the M end users.

The end-user database 42 of the end user 40 includes entertainment scheduling data that is obtained from the real-time database 20 via the communication interface 30 between the real-time database 20 and the end user 40. The entertainment scheduling content that is transmitted from the real-time database 20 to the end-user database 42 of the end user 40 is end-user dependent and thus comprises a subset of the updates 18 that results from application of end-user selection criteria; i.e., each individual end user receives entertainment scheduling content that is individualized for said individual end user. For example if the entertainment scheduling data comprises TV scheduling data, then one end user may have arranged to receive updates relating to particular TV channels but not to other TV channels, while another end user may have arranged to receive updates relating to particular type of TV programs (e.g., sports programs) but not to other types of TV programs.

The entertainment scheduling content that is transmitted from the real-time database 20 to the end user 40 may be derived from the updates 18 and is configured within the real-time database 20 as one or more datasets 21. A dataset is a collection of data. An example of a dataset is a "linear dataset" which is a linear array of data. Examples of a linear dataset include: a record of a file, a row of a table, a column of a table, etc. To illustrate, the entertainment scheduling content that is transmitted from the real-time database 20 to the end user 40 may take the form of a file that comprises linear datasets, namely records. Another example of a dataset is a set of extensible Markup Language (XML) data.

A dataset is considered to have been logically modified if the dataset changes in content or in the ordering of content. As a first example, modifying a dataset by adding or deleting fields results in a logical modification of the dataset. As a second example, if the text "heet" in a dataset is changed to "heat", then the dataset has been logically modified. As a third example, if the number "1000.00" in a dataset is changed to "1.0E+03", then the dataset has been logically modified. As a fourth example, if a dataset has three fields sequentially ordered as field 1, field 2 and field 3, then a reordering of the fields into the sequence of field 2, field 1, and field 3 represents a logical modification of the dataset. However, a change in form of representation of a dataset (e.g., row of a table to record of a file or vice versa) is not a modification of the dataset. A feature that is within the scope of the present invention is transmitting the dataset from the real-time database 20 to the end user 40, and then updating the end-user database 42 of the end user 40 without logical modification of the dataset. This feature speeds and simplifies the updating of the end-user database 42.

In FIG. 1, the FTP server 22 may function as a "destination" that interfaces between the real-time database 20 and the communication interface 30. For example, the dataset 21 (which includes entertainment scheduling content of the updates 18) that is transmitted from the real-time database 20 to the end user 40 may be first pushed by pushing software 24 to a computer-readable medium of the FTP server 22 where the dataset 21 may be recorded and "parked" and denoted, while within the FTP server 22, as dataset 23 until subsequently transmitted from the FTP server 22 to the end user 40 via the communication interface 30. The direction of the arrowhead shown on the communication path 5 between the push software 24 and the real-time database 20 denotes that the push software 24 is pushing the dataset 21 from the real-time database 20 to a computer-readable medium of the FTP server 22 over a communication path 4. The parked dataset 23 on the FTP server 22 is individualized for the end user 40, and other datasets on the FTP server 22 are individualized for other end users. The subsequent transmission from the FTP server 22 to the end user 40 may be effectuated by "pulling" or "pushing" the dataset 23 that is parked on a computer-readable medium of the FTP server 22. The end user 40 may "pull" the parked dataset 23 across the communication interface 30 and into the end user 40 (and into the end-user database 42) through use of the pull software 44 that is comprised by the user 40. Thus in FIG. 1, the direction of the arrowhead shown on the communication path 7 between the pull software 44 and the end-user database 42 denotes that the pull software 44 is pulling the dataset 23 from a computer-readable medium of the FTP server 22 to the end user 40 across the communication interface 30. Alternatively, the parked dataset 23 may be pushed across the communication interface 30 and into the end user 40 (and into the end-user database 42) through use of the push software 26 that is coupled to the FTP server 22. The direction of the arrowhead shown on the communication path 6 between the push software 26 and the FTP server 22 denotes that the push software 26 is pushing the dataset 23 from a computer-readable medium of the FTP server 22 to the end user 40 across the communication interface 30. Thus, "pulling" the dataset 23 into an end user from a source comprises using software that exists within the end user to trigger copying the dataset from the source and transmitting the copied dataset to the end user. "Pushing" a dataset into an end user from a source comprises using software external to the end user to trigger copying the dataset from the source and transmitting the copied dataset to the end user.

Pushing the dataset 21 (that is ultimately intended to be transmitted to the end user 40 as the dataset 23) from the real-time database 20 to a computer-readable medium of the FTP server 22 may be triggered to occur upon satisfaction of a condition. The condition may be individualized for individual end users. The condition may be time dependent. For example, one end user may have arranged for the dataset 21 to be pushed to a computer-readable medium of the FTP server 22 at 8:00 AM every day, while another end user may have arranged for the dataset 21 to be pushed to a computer-readable medium of the FTP server 22 at 12:00 AM every Sunday. The condition may be event dependent. For example for TV scheduling updates, an end user may have arranged for the dataset 21 to be pushed to a computer-readable medium of the FTP server 22 whenever the updates 18 include the appearance of a new TV program. The condition may be content dependent. For example for TV scheduling updates, an end user may have arranged for the dataset to be pushed to a computer-readable medium of the FTP server 22 whenever the updates 18 include strong language or adult situations. The condition may be primary key dependent. For example, the condition may comprise a requirement that a primary key of the dataset 21 matches a key in a list of keys, wherein the primary key makes the dataset unique within the real-time database. To illustrate for FIGS. 4-7, the list of primary keys may include the station identifier primary key of the station record (see FIG. 5) and the program identifier primary key of the program record (see FIG. 6), so that if the dataset is a station record or a program record then the dataset will be pushed from the real-time database 20 to a computer-readable medium of the FTP server 22. The condition may include a requirement that the updates 18 include a specified data item that is being changed to a preselected value (e.g., the data item is: availability of closed captioning; and the preseleted value in the updates 18 is: YES, meaning that closed captioning is available). The condition may be expressed in any form such as a logical expression involving logical operators (e.g., AND, OR, NOT, etc.) and having any degree of logical complexity.

Although the FTP server 22 has been described herein as a destination that interfaces between the real-time database 20 and the communication interface 30, for the temporary parking of a dataset to be transmitted from the real-time database 20 to the end user 40, any other device or mechanism known to a person of ordinary skill in the art could be used instead of the FTP server 22 to provide the functionality of the FTP server 22.

Figure 2:
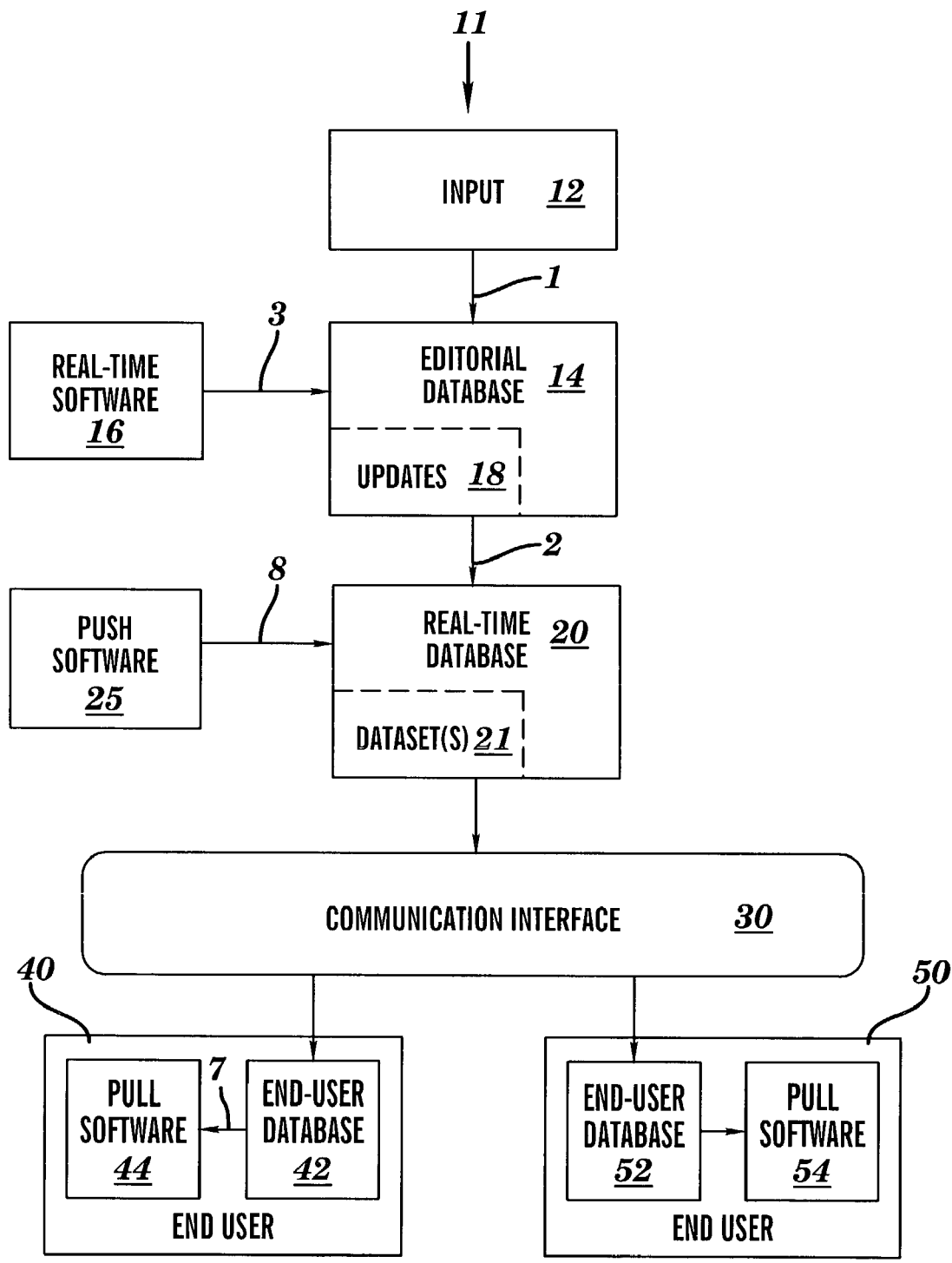
FIG. 2 depicts the system of FIG. 1 without the FTP server, in accordance with embodiments of the present invention.

FIG. 2 depicts a system 11, which is equivalent to the system 10 of FIG. 1 without the FTP server 22, in accordance with embodiments of the present invention. Aside from aspects of the system 11 as described infra, the features of the system 11 of FIG. 2 are the same as the corresponding features of the system 10 of FIG. 1 that have been described supra.

In FIG. 2, the real-time database 20 has been updated with the updates 18 extracted from the editorial database 14, as in FIG. 1. Subsequent transmission of the dataset 21 comprising a portion of said updates 18 from the real-time database 20 to the end user 40 may be effectuated by pulling or pushing the dataset 21 into the end-user database 42 of the end user 40. The end user 40 may pull the dataset 21 from the real-time database 20 across the communication interface 30 and into the end-user database 42 of the end user 40 through use of the pull software 44 that is comprised by the user 40. Thus in FIG. 2, the direction of the arrowhead shown on the communication path 7 between the pull software 44 and the end-user database 42 denotes that the pull software 44 is pulling the dataset 21 from the real-time database 20 to the end-user database 42 via across the communication interface 30. Alternatively, the dataset 21 may be pushed from the real-time database 20 across the communication interface 30 and into the end-user database 42 of end user 40 through use of the push software 25 that is coupled to the real-time database 20. Thus, the direction of the arrowhead shown on the communication path 8 between the push software 25 and the real-time database 20 denotes that the push software 25 is pushing the dataset 21 from the real-time database 20 to the end-user database 42 via across the communication interface 30. If the dataset is transmitted into the end-user database 42 immediately or shortly after the real-time database is updated (as described supra), then the end-user database 42 may be viewed as being updated in real time.

Transmitting, via pulling or pushing as described supra, the dataset from the real-time database 20 to the end-user database 42 of the end user 40 may be triggered to occur upon satisfaction of a condition. The condition may be individualized for individual end users. The condition may be time dependent. For example, one end user may have arranged for the dataset 21 to be transmitted to the end-user database 42 at 8:00 AM every day, while another end user may have arranged for the dataset to be transmitted to the end-user database 42 at 12:00 AM every Sunday. The condition may be event dependent. For example for TV scheduling updates, an end user may have arranged for the dataset to be transmitted to the end-user database 42 whenever the updates 18 include the appearance of a new TV program. The condition may be content dependent. For example for TV scheduling updates, an end user may have arranged for the dataset to be transmitted to the end-user database 42 whenever the updates 18 include strong language or adult situations. The condition may be primary key dependent. For example, the condition may comprise a requirement that a primary key of the dataset matches a key in a list of keys, wherein the primary key makes the dataset unique within the real-time database. To illustrate for FIGS. 4-7, the list of primary keys may include the station identifier primary key of the station record (see FIG. 5) and the program identifier primary key of the program record (see FIG. 6), so that if the dataset is a station record or a program record then the dataset will be transmitted from the real-time database 20 to the end-user database 42. The condition may include a requirement that the updates 18 include a specified data item that is being changed to a preselected value (e.g., the data item is: availability of closed captioning; and the value in the updates 18 is: YES, meaning that closed captioning is available). The condition may be expressed in any form such as a logical expression involving logical operators (e.g., AND, OR, NOT, etc.) and having any degree of logical complexity.

Figure 3:
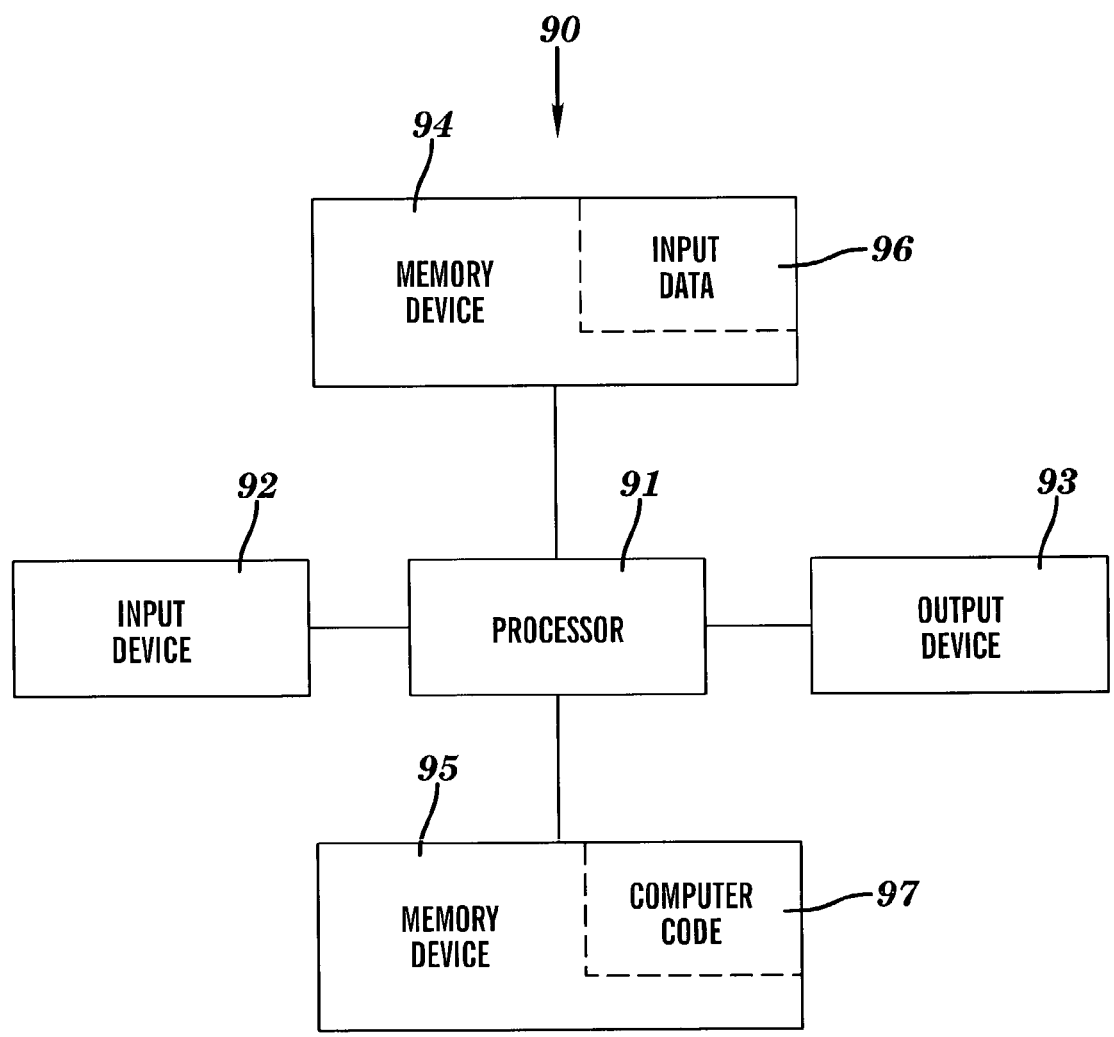
FIG. 3 depicts a computer system for distributing entertainment scheduling data to end users from a real-time database, in accordance with embodiments of the present invention.

FIG. 3 illustrates a computer system 90 for distributing entertainment scheduling data to end users from the real-time database 22 of FIGS. 1 and 2, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms associated with any or all of the software of FIGS. 1 and 2 described supra, namely the real-time software 16 (see FIG. 1), the push software 24 (see FIG. 1), the push software 26 (see FIG. 1), the pull software 44 (see FIG. 1), the pull software 54 (see FIG. 1), and the push software 25 (see FIG. 2). The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 9) may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

While FIG. 3 shows the computer system 90 as a particular configuration of hardware and software, any configuration of hardware and software, as would be known to a person of ordinary skill in the art, may be utilized for the purposes stated supra in conjunction with the particular computer system 90 of FIG. 9. For example, the memory devices 94 and 95 may be portions of a single memory device rather than separate memory devices.

The computer system 90 of FIG. 3 represents any of several different computer systems of the present invention. As a first example, the computer system 90 of FIG. 3 may include some or all of the editorial database 14, the real-time database 20, real-time software 16, push software 24, push software 26, push software 25, and FTP server 22, wherein any or all of the preceding software and databases may be stored in one or both of the memory devices 94 and 95 of FIG. 3. As a second example, the computer system 90 of FIG. 3 may pertain to an end user such as the end user 40 of FIGS. 1 and 2, and thus store the end-user database 42 and pull software 40 in one or both of the memory devices 94 and 95.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

We claim:

1. A method for distributing entertainment scheduling content in real-time from an editorial database to a real-time database, and then to a destination server, and then to an end-user database via a communication link, the distribution to the end-user database being based upon a plurality of end-user selection criteria, the method comprising the following steps:

entering the entertainment scheduling content into the editorial database, wherein the editorial database is recorded in a first computer-readable medium and wherein the entertainment scheduling content comprises new entertainment scheduling data not previously stored in the editorial database and correction entertainment scheduling data intended to replace existing data in the editorial database;

extracting the entertainment scheduling content from the editorial database wherein extraction of the content from the editorial database is based on factors other than a target environment context of any end users;

updating the real-time database with the extracted entertainment scheduling content by pushing via real-time software the entertainment scheduling content from the editorial database to the real-time database, wherein the real-time database is recorded in a second computer-readable medium;

adapting a portion of the entertainment scheduling content stored in the real-time database into an end-user specific dataset by applying a plurality of end-user selection criteria to the entertainment scheduling content stored in the real-time database;

pushing the end-user specific dataset to the destination server, wherein the destination server stores the dataset in a third computer-readable medium;

pulling the dataset from the destination server to the end-user database wherein the dataset is pulled to the end-user database via pull software running on the end user database, wherein the end-user database is recorded in a fourth computer-readable medium, the end-user database corresponds to the end-user selection criteria, and the dataset is adapted to be transmitted to the end-user database via the communication link between the destination server and the end-user database; and updating the end-user database with the dataset without logical modification of the dataset.

2. The method of claim 1, wherein entering the entertainment scheduling content into the editorial database ends at time $T_1$ and updating the real-time database with the extracted entertainment scheduling content ends at time $T_2$, wherein $T_2 - T_1$ does not exceed about 240 minutes.

3. The method of claim 1 further comprising repeating N times said updating the real-time database with additional entertainment scheduling content derived from the editorial database, wherein N is at least 1, wherein for each updating, $\Delta T$ indicates $T_2 - T_1$ for the respective updating, wherein $\Delta T_{AVE}$ is the statistical average computed as $\Sigma(\Delta T)/N$, and wherein $\Delta T_{AVE}$ does not exceed about 10 minutes.

4. The method of claim 3, wherein the statistical average is an arithmetic average.

5. The method of claim 1, wherein said updating comprises multi-threaded updating of said real-time database with said content.

6. The method of claim 1, wherein said entertainment scheduling data comprises television program scheduling data, and wherein said entertainment scheduling content comprises television program scheduling content.

7. The method of claim 1, wherein said entertainment scheduling data comprises movie-theatre scheduling data, and wherein said entertainment scheduling content comprises movie-theatre scheduling content.

8. The method of claim 1, wherein said entertainment scheduling data comprises scheduling data selected from the group consisting of sports events scheduling data, musical performance scheduling data, and live theatre scheduling data, and wherein said entertainment scheduling content comprises scheduling content selected from the group consisting of sports events scheduling content, musical performance scheduling content, and live theatre scheduling content.

9. The method of claim 1, wherein the destination server is a File Transfer Protocol (FTP) server.

10. The method of claim 1, wherein the communication link comprises the Internet.

\* \* \* \* \*